United States Patent
Maria Mes

[11] 3,713,722
[45] Jan. 30, 1973

[54] ELECTRO-OPTICAL MODULATION APPARATUS USING A SQUARE-WAVE SIGNAL

[75] Inventor: Johannes Antonius Maria Mes, Emmasingel, Eindhoven, Netherlands

[73] Assignee: U.S. Philips Corporation, New York, N.Y.

[22] Filed: April 12, 1971

[21] Appl. No.: 133,004

[30] Foreign Application Priority Data

April 13, 1970 Netherlands..................7005295

[52] U.S. Cl...................................350/150, 350/157
[51] Int. Cl..................................................G02f 1/26
[58] Field of Search.....................350/150, 160, 157

[56] References Cited

UNITED STATES PATENTS 3,409,781  11/1968  Immarco et al........................350/150
3,069,973  12/1962  Ames......................................350/150
3,501,220  3/1970   Bernalg et al. .......................350/150
3,609,007  9/1971   Peek......................................350/150

*Primary Examiner*—Ronald L. Wibert
*Assistant Examiner*—V. P. McGraw
*Attorney*—Frank R. Trifari

[57] ABSTRACT

An electro-optical modulation apparatus for modulating the orientation of the plane of polarization of an information carrying light beam uses a square-wave voltage to energize one of three birefringent crystals located in the light beam to a level necessary for rotating the plane of polarization of the energizing beam 90°. The energizing beam is split into subbeams by a polarization sensitive beam splitter and directed to two radiation detectors through corresponding polarizers.

2 Claims, 4 Drawing Figures

ELECTRO-OPTICAL MODULATION APPARATUS USING A SQUARE-WAVE SIGNAL

The invention relates to an improvement of an electro-optical modulation apparatus for modulating the orientation of the plane of polarization of a light beam which serves as an information carrier in an optical measuring system, which apparatus includes a series combination of a least three birefringent elements arranged with suitable relative orientations, at least one of these elements being an electro-optical crystal to which an electrical modulation voltage may be applied.

Figure 1:
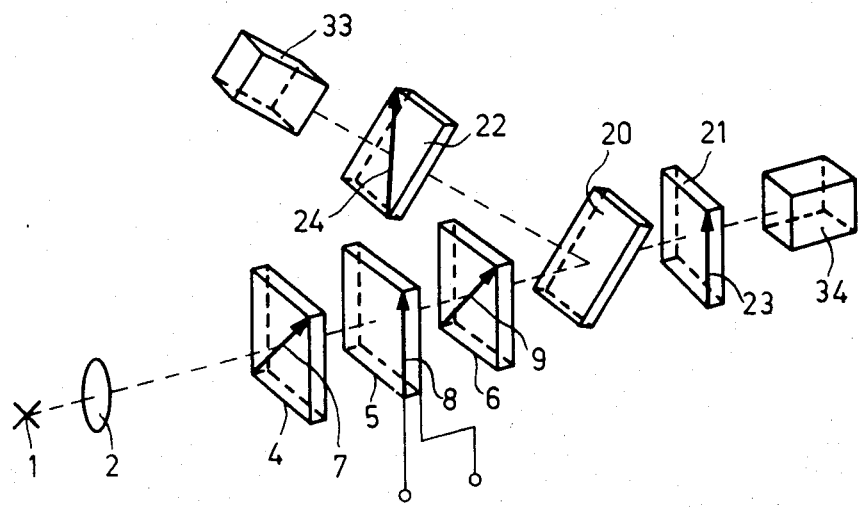

Such an electro-optical modulation apparatus is known, and is described inter alia with reference to FIG. 1 of copending Application Ser. No. 187,172, filed Oct. 6, 1971. In the apparatus for detecting the orientation of the plane of polarization of a plane-polarized beam of radiation described in the said application a modulation voltage is applied to an electro-optical crystal, which is inserted in the light path between two $\lambda/4$ plates. The radiation beam which emerges from the electro-optical modulator is split into two sub-beams by a dividing mirror. Each of the sub-beams traverses a polarizer and then falls on a radiation-sensitive detector. Electrical signals are produced at the outputs of the two radiation-sensitive detectors.

In this a harmonic voltage is applied to the electro-optical crystal. As a result, signals having an extensive frequency spectrum are produced at the outputs of the radiation-sensitive detectors. For further processing these signals first are to be filtered in a narrow band about the modulation frequency. However, filtering not only involves a certain time delay but also some deformation of the information. Moreover, the restricted bandwidth of the filter sets an upper limit to the accurately detectable angular velocity of the plane of polarization.

It is an object of the invention to provide an improved electro-optical modulation apparatus which does not suffer from the above disadvantages. The improvement consists in that the voltage to be applied to the crystal is a square-wave voltage having an amplitude such that the plane of polarization of a lightbeam passing through the modulation apparatus is rotated through 90° either clockwise or counterclockwise according to the sign of the square-wave voltage. This allows the information contained in the electrical signals to be recovered from these signals without the need for filtering in a narrow band about the modulation frequency.

Figure 2:
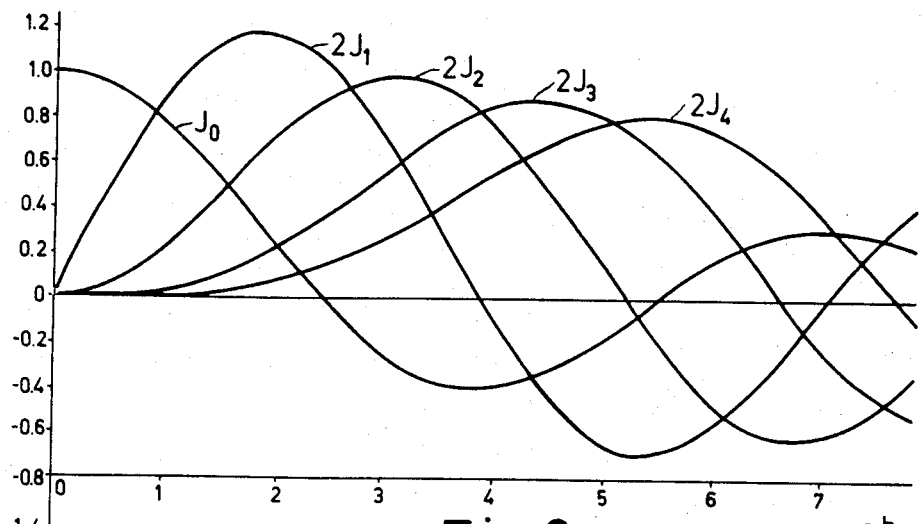
Figure 4:
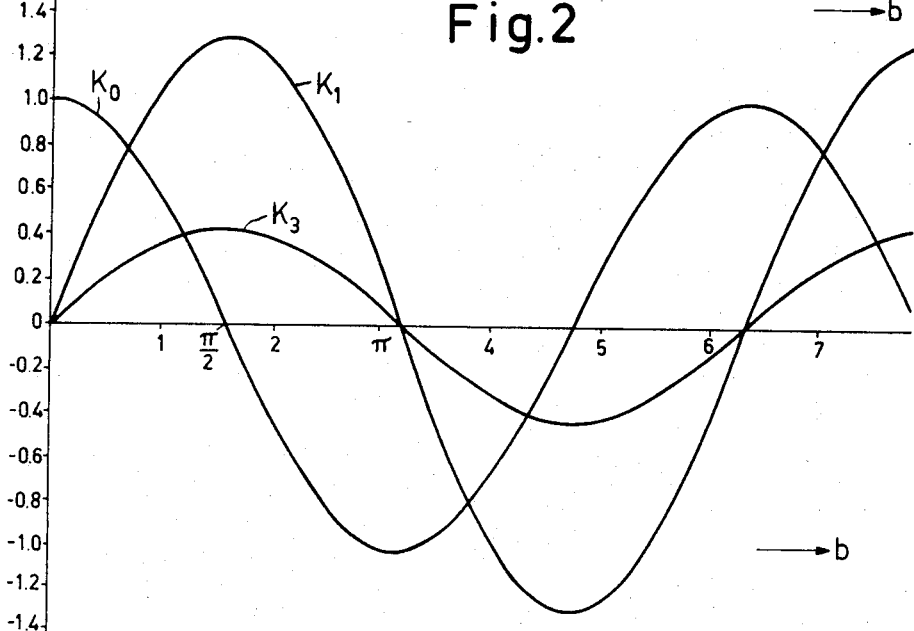
Figure 3:
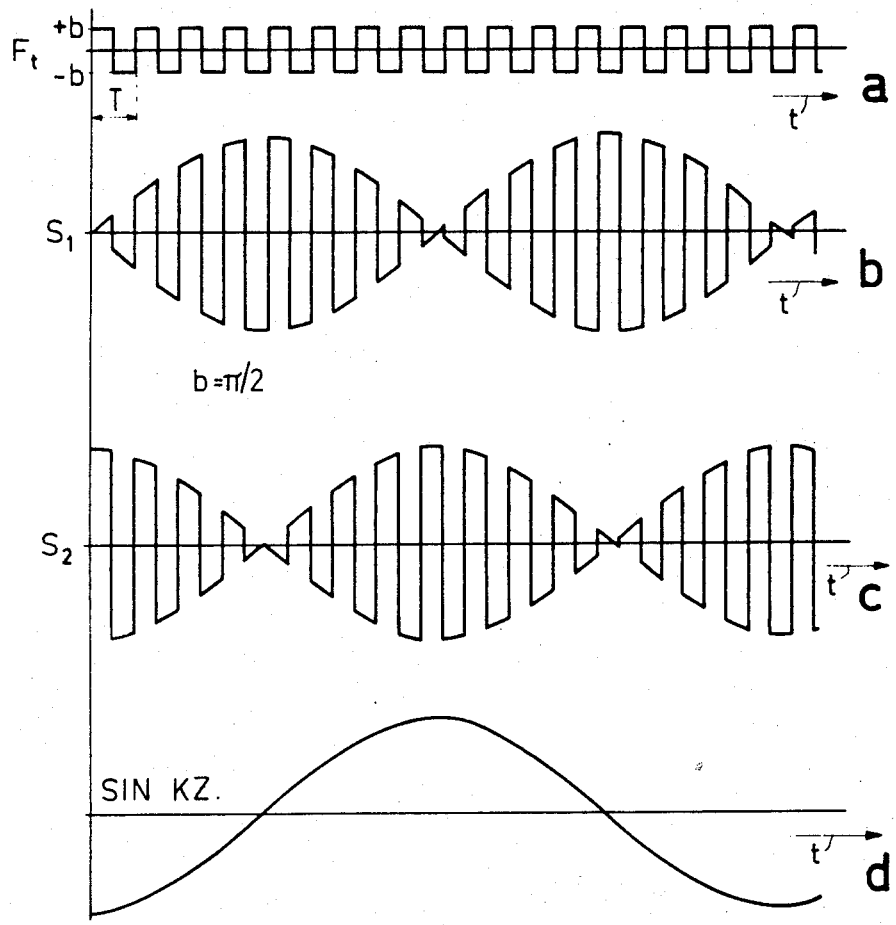

An embodiment of the invention will now be described, by way of example, with reference to the accompanying diagrammatic drawings, in which:

FIG. 1 shows an apparatus for determining the orientation of the plane of polarization of a plane-polarized beam of radiation, which apparatus includes an electro-optical modulator, FIG. 2 shows, as a function of the modulation depth, the wave forms of components of the signals obtained from the apparatus shown in FIG. 1 with the use of a harmonic modulation voltage, FIG. 3 shows a square-wave voltage and the wave forms of the signals obtained in the apparatus shown in FIG. 1 by means of the square-wave voltage, and FIG. 4 shows, as a function of modulation depth, components of the signals illustrated in FIG. 3.

Referring now to FIG. 1, there is shown an apparatus in which plane-polarized radiation, which is emitted by a source 1 and is converted into a parallel beam by a lens 2, traverse the series arrangement of, in this order, a $\lambda/4$ plate 4, a KDP crystal 5 and a $\lambda/4$ plate 6. The principal directions 7 and 9 of the $\lambda/4$ plates 4 and 6 are parallel to one another, and the principle direction 8 of the crystal 5 is at an angle of 45° to those of the plates 4 and 6. The radiation beam is then split into two sub-beams by a dividing mirror 20. The sub-beams are incident on polarizers 21 and 22, respectively, the polarization directions 23 and 24 of which are at an angle of 45° to one another. The sub-beams which emerge from the polarizers 22 and 21 are converted into electrical signals by detectors 33 and 34, respectively.

According to Patent application Ser. No. 187,172, filed Oct. 6, 1971 an alternating voltage $V = V_0 \cos \omega t$ is applied to the crystal 5. The output signals of the detectors then will be of the form:

$$S_1 = A + B \sin(kz + b \cos \omega t) \quad (1a)$$

$$S_2 = A + B \cos(kz + b \cos \omega t) \quad (1b)$$

where $kz$ denotes the orientation of the plane of polarization of the radiation emitted by the source 1, $b$ is the modulation depth of the sinusoidal modulation, and $A$ and $B$ are constants. The functions which represent the signals $S_1$ and $S_2$ may be expanded in a series:

$$S_1 = A + B \sin kz \{J_0(b) + 2J_2(b) \cos 2\omega t + 2J_4(b) \cos 4\omega t + .\}$$

$$+ B \cos kz \{2J_1(b) \cos \omega t + 2J_3(b) \cos 3\omega t + \}$$

$$S_2 = A + B \cos kz \{J_0(b) + 2J_2(b) \cos 2\omega t + 2J_4(b) \cos 4\omega t + .\}$$

$$- B \sin kz \{2J_1(b) \cos \omega t + 2J_3(b) \cos 3\omega t + .\}$$

where $J_n(b)$ represents the Bessel function of the $n^{th}$ order.

The above series expansions show that the frequency spectrum of both signals is very extensive. For the processing of the information, only the terms including $J_1(b)$ are of interest. From FIG. 2, which shows the first five Bessel functions as a function of the modulation depth $b$, it will be seen that for a small modulation depth $J_0(b)$ is greater than $2 J_1(b)$, while $2 J_2(b)$ is small. For $J_0(b) = 0$ (i.e. for $b = 2.4$), however, $2 J_1(b)$ = about equal to $2 J_2(b)$. It is not possible to indicate a value at which $J_1(b)$ is so great that the remaining Bessel functions may be neglected. In order to eliminate the influence of the Bessel functions $J_0(b), J_2(b)$, and so on, the signals $S_1$ and $S_2$ must be filtered in a band about the center frequency $\omega$.

However, this filtering process will cause a certain deformation of the information. Furthermore, there will occur a certain time delay in the information. Moreover, the restricted bandwidth of the filter sets an upper limit to the angular velocity of the plane of polarization which still may by accurately determined. In any case, the time derivative of $kz$ must be smaller than $\frac{1}{2}\omega$. If a high degree of accuracy is required, then $d/dt (kz)$ must remain well below the limit of $\frac{1}{2}\omega$. The use of a harmonic modulation voltage provides the additional disadvantage that the modulation is not completely in phase with, nor has a constant phase shift relative to, a synchronization voltage, unless modulation is effected by large powers.

According to the invention modulation is effected with a square-wave voltage instead of with a harmonic voltage. At a suitable amplitude of the square-wave voltage the above disadvantages do not occur.

If a square-wave voltage as shown in FIG. 3a is applied to the crystal 5 of FIG. 1, the following signals will be produced at the outputs of the detectors 33 and 34:

$$S_1 = A + B \sin \{kz + b f(t)\}$$

$$S_2 = A + B \cos \{kz + b f(t)\}$$

with $$f(t) = +1 \text{ for } nT < t < (n+\tfrac{1}{2}) T$$

$$f(t) = -1 \text{ for } (n+\tfrac{1}{2}) T < t < (n+1) T$$

where $n = 0, 1, 2, \ldots$

The repetition frequency of the square-wave voltage may be equated to: $\omega = 2\pi/T$.

The functions which represent the signals $S_1$ and $S_2$ may again be expanded in a series:

$S_1 = A + B K_0(b) \sin kz + B \cos kz \{K_1(b) \sin\omega t + K_3(b \sin 3\omega t + K_5(b) \sin 5\omega t + \ldots\}$ $S_2 = A + B K_0(b) \cos kz - B \sin kz \{K_1(b) \sin\omega t + K_3(b \sin 3\omega t + K_5(b) \sin 5\omega t + \ldots\}$ where $K_n(b) = K_1(b)/n$.

Now, no terms containing $\cos n\omega t$ occur in the signals $S_1$ and $S_2$, while terms containing $\sin \omega t$ will occur for odd values of $n$ only. Furthermore, for every value of $b$ there is a constant ratio between the terms containing $\sin n\omega t$.

In FIG. 4, $K_o$, $K_1$ and $K_3$ are plotted as functions of $b$. Here we have:

$$K_o(b) = \cos b$$

and $$K_1(b) = 4/\pi \sin b.$$

For a value of $b$ smaller than $\pi/2$ the factor $K_1(b)$ is greater than the factor $2J_1(b)$ of FIG. 2 by at least 10 percent. For $b = \pi/2$ is:

$$K_o = 0$$

and $$K_1 = 4/\pi.$$

For this value of the modulation depth no filtering in a narrow band is required. This has the large advantage that no limit is set to the value of $d/dt (kz)$.

In FIG. 3, $\sin kz$, $f(t)$ and the signals $S_1$ and $S_2$ are plotted as functions of time. The envelopes of $S_1$ and $S_2$ represent the information and may accurately be recovered by means of simple synchronous detectors without the occurrence of a time delay.

The phase of the square-wave modulation voltage may be maintained in phase with a synchronization voltage by simple means, while smaller powers are needed than are required in the case of a harmonic modulation voltage.

In the apparatus described, the single electro-optical crystal may be replaced by the series arrangement of several component crystals. This allows the voltage applied to each component crystal to be reduced by a factor equal to the number of the component crystals.

The improvement of the electro-optical modulation apparatus has been described with reference to an apparatus for determining the orientation of a plane of polarization. Obviously this improvement may also be used in other apparatus which include an electro-optical modulator and in which signals of the forms (1a) and (1b) occur. In this connection we have in mind an apparatus for determining the movement of an object relative to another object.

What is claimed is:

1. An electro-optical modulation apparatus for modulating the orientation of the plane of polarization of an information-carrying light beam, comprising at least three aligned birefringent elements in the light beam, at least two of the birefringent elements having parallel principal directions, at least one of the birefringent elements having a principal direction offset 45° from the two birefringent elements having parallel principal directions, means connected to the birefringent element having an offset principal direction for receiving a symmetrical square-wave signal having a frequency higher than the frequency of the information carried by the light beam and having an amplitude sufficient to rotate the plane of polarization of the light beam passing through the birefringent elements by 90°.

2. An apparatus as claimed in claim 1, further comprising a polarization-sensitive beam splitter in the path of the radiation passing through the birefringent elements for dividing the radiation into two subbeams, a polarizer in the path of each subbeam, the directions of polarization of the polarizers being offset 45° with respect to one another, and a separate photo-electric detecting means in the path of each subbeam passing through the corresponding polarizer.

* * * * *